United States Patent [19]

Barbour, Jr.

[11] B 3,990,337

[45] Nov. 9, 1976

[54] PRECISION BOOK CUTTER WITH INCLINED BIT

[75] Inventor: Richard H. Barbour, Jr., Milton, Mass.

[73] Assignee: Comstock & Wescott, Inc., Cambridge, Mass.

[22] Filed: Jan. 31, 1975

[21] Appl. No.: 545,935

[44] Published under the second Trial Voluntary Protest Program on January 27, 1976 as document No. B 545,935.

[52] U.S. Cl. ................................ 83/425; 29/105 R; 83/435.2; 83/839; 83/840; 83/841; 83/925 A; 144/223; 144/235

[51] Int. Cl.$^{2}$ ..................... B26D 7/06; B23D 57/00; B26D 1/12

[58] Field of Search .............. 29/105 R, 78; 83/698, 83/699, 700, 838, 839, 840, 663, 664, 356.3, 925 A, 841, 404.4, 844, 303, 331, 425, 435.2; 144/218, 230, 241, 219, 223, 235, 231

[56] References Cited

UNITED STATES PATENTS

| | | | |
|---|---|---|---|
| 3,297,067 | 1/1967 | Zaichkowsky | 144/235 X |
| 3,726,167 | 4/1973 | Barbour, Jr. | 83/37 |
| 3,822,626 | 7/1974 | Aspinwall | 83/925 A X |

*Primary Examiner*—Travis S. McGehee
*Assistant Examiner*—W. D. Bray
*Attorney, Agent, or Firm*—James H. Grover

[57] ABSTRACT

A precision book cutting wheel with insertable cutting bits has sockets slidingly receiving the bits and a clamping block for holding the bit in adjusted position. The sockets are inclined at an angle of 20° to 40° to a cutting plane normal to the axis of the wheel, and each bit has an outer cutting edge formed by a bevel parallel to and adjustable to the cutting plane.

8 Claims, 7 Drawing Figures

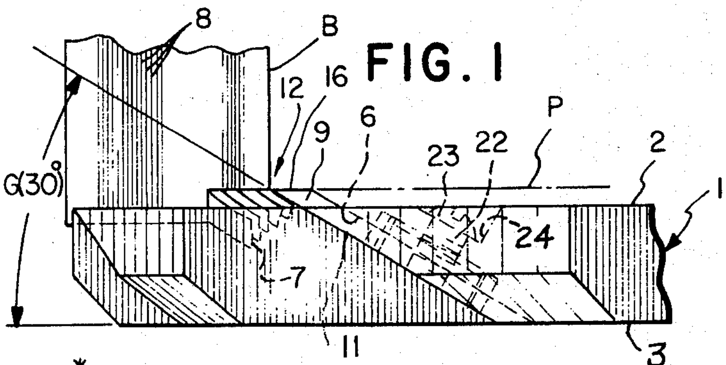
FIG. 1
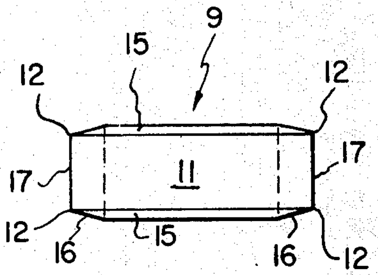
FIG. 3
FIG. 4
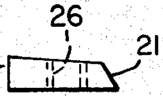
FIG. 5A
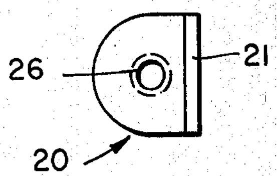
FIG. 5
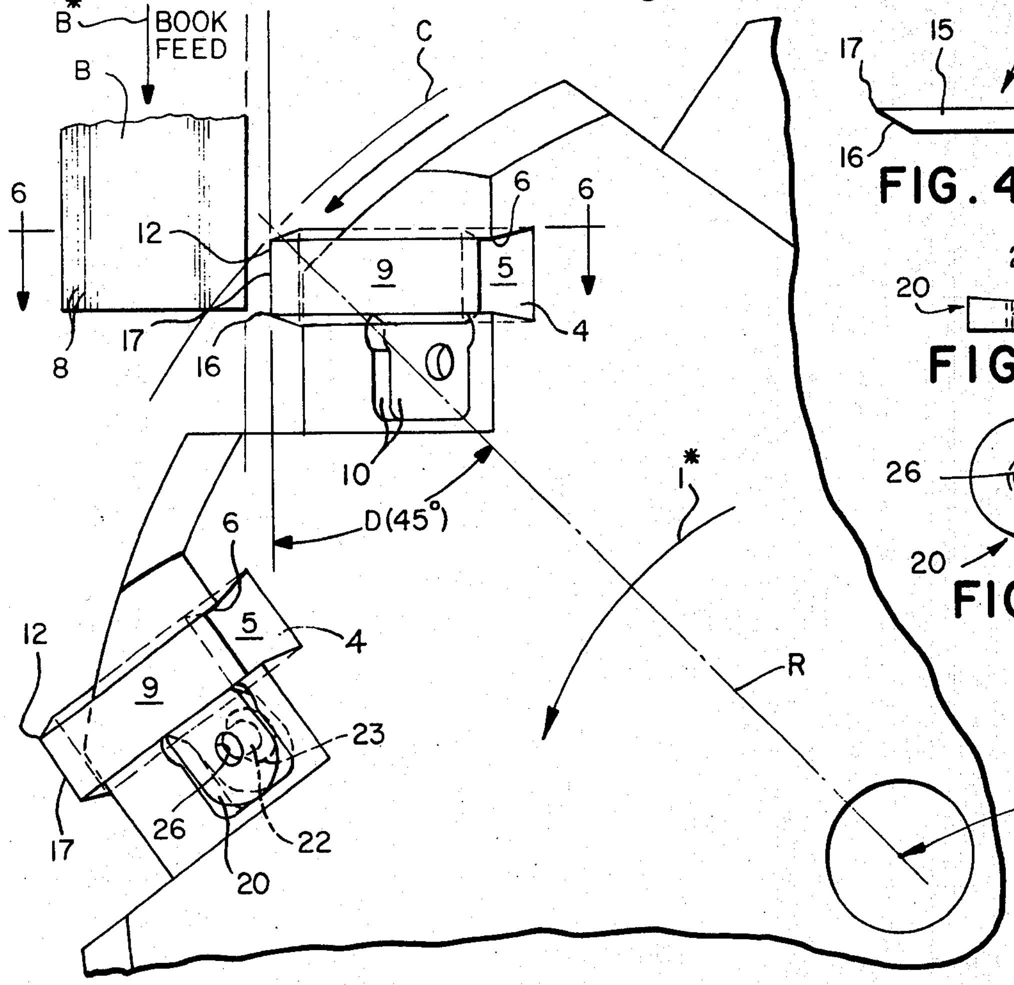
FIG. 2
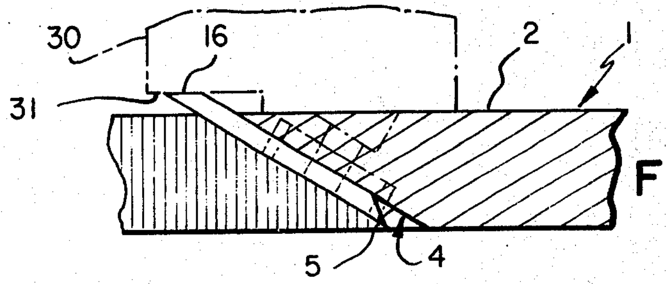
FIG. 6

PRECISION BOOK CUTTER WITH INCLINED BIT

BACKGROUND OF THE INVENTION

This invention constitutes an improvement on the apparatus shown in U.S. Pat. No. 3,726,167 issued Apr. 10, 1973 to Richard H. Barbour, Jr. and U.S. Pat. No. 3,822,626 issued July 9, 1974 to Peter Aspinwall, which patents are incorporated herein by reference. These patents disclose a pair of counter rotating wheels for precise and substantially dustless trimming or cutting of the collated pages of unbound books conveyed in clamps through a cutting plant.

STATEMENT OF INVENTION

According to the invention a book cutter comprises a wheel rotating about an axis normal to a book cutting plane, the wheel forming a plurality of cutting bit sockets inclined at a predetermined angle, to the book cutting plane, cutting bits for respective sockets, each bit having a body received in one of the sockets and a cutting edge bevel at one end of the body inclined to the body at said predetermined angle, the cutting edge formed by the bevel being disposed parallel to the book cutting plane, and means for securing each bit in its socket with the bevel parallel to the cutting plane.

DRAWINGS

FIG. 1 is a partial side elevation of a book cutting wheel according to the invention;

FIG. 2 is an underside plan view of the wheel;

FIG. 3 is a plan view of a cutting bit for the wheel;

FIG. 4 is a side view of the bit;

FIGS. 5A and 5B are a side elevation and a plan view of a clamp securing the bit to the wheel; and FIG. 6 is a section on line 6—6 of FIG. 2.

DESCRIPTION

Shown in FIGS. 1 to 5 are a wheel 1 and a clamp 20 for holding bits 9 on the wheel for precision trimming or cutting of the collated pages 8 of a book 3. As shown in United States Pat. Nos. 3,726,167 and 3,822,626, to which previous reference was made, the book is conveyed in clamps in the direction indicated by the arrow B* (FIG. 2) past the wheel 1 whose bits 9 cut strips 7 from the edge of the book in a cutting plane P. The cutting wheel 1 has an upper face 2 and lower face 3 parallel to the book cutting plane P and normal, i.e. perpendicular, to the rotational axis A of the wheel.

Equally spaced around the periphery of the wheel are a number, e.g. ten, of sockets 4, receiving the cutting bits 9. Each socket has an inner face 5 with an overlapping lip or half-dovetail 6. Adjacent the inner face 5 is a recess 10 receiving the bit clamps 20. The inner socket face 5 and bit 9 therein, the lip 6 and the recess 10 are inclined at an angle D of about 45° to the wheel radius R passing through the outermost point 12 of the bit 9. This inclination being in the direction 1* of rotation of the wheel 1. Additionally the socket 4 including its inner face 5 and lip 6 are inclined upwardly at an angle G to the book cutting plane P and upper surface 2 of the wheel. This second inclination is preferably approximately 30°, 20° to 40° also being practical.

The bit 9 has two opposite, parallel longitudinal surfaces 11 and 13 joined by longitudinal dovetail bevels 15 matching the half-dovetail lip 6 of the sockets 4 in the wheel 1. At each end of the bit is an end bevel 16 from surface 13 to surface 11 forming a cutting edge 17 with cutting points 12. All four of the points 12 are useful, one at a time, in different positions on counter rotating wheels as described in the previously cited U.S. Pat. No. 3,822,626. Each bit is secured in its socket by the clamp 20. As shown in FIGS. 5A and 5B the clamp has a lip 21 mating the longitudinal bit bevel 15 opposite the half-dovetail lip 6. The clamp is drawn toward the bit by a screw 22 whose head 23 bears on an inclined recess 24 in the upper surface 2 of the wheel 1. The clamp has a threaded bore 26 receiving the screw 22.

When clamped in its socket the bit 9 extends upwardly to the cutting plane P at an angle G to the cutting plane predetermined by the second inclination of the socket. The end bevel 16 of each bit is ground at the same predetermined angle as the socket and thus lies in a plane parallel to the cutting plane P and normal to the axis A of wheel rotation. The cutting edge 17 and its cutting point 12 also lie in the same plane as the end bevel. This second inclination of the bit relative to the cutting plane affords several advantages over the wheel of patent No. 3,822,626 while retaining all the merits of that patent.

First, only the relatively small cutting or end bevel 17 need be ground precisely.

Secondly, all the bits on a wheel need not be ground to the same length in relation to a register hole in the bit as in the patent. Bits of different lengths can be slidingly adjusted in their respective sockets so that their cutting points 12 are in a common cutting plane, and approximately equidistant radially of the wheel.

Thirdly, the radial adjustment of the bits can be made easily without touching the cutting edge 17 or cutting point 12 with metal. As shown, in FIG. 6 a metal block 30 having a flat 31 spaced slightly above and parallel to the upper wheel surface 2 may be rested or magnetically held on the wheel surface while the bit is adjusted upwardly until the bit end bevel 17 bears on the flat 31. After successive bits are so adjusted and clamped all of them will necessarily have their end bevels 16 in the same cutting plane and their cutting points 12 on the same approximate circumference.

Fourthly, by clamping the bits with their cutting edges 17 and cutting points 12 facing away and spaced from the faces 5 of the bit sockets 4, the cutting edges and points are out of contact with the metal socket and are far less subject to being dulled during insertion and adjustment and during operation as described in U.S. Pat. No. 3,822,626, because only the outer cutting edge is in the cutting plane. On the wheel of the patent the cutting edges at both ends of the bit are in the cutting plane. Moreover, with the patented wheel the relatively large surface 11 is in the cutting plane and rubs against the book picking up an accumulation of paper resins. According to the present invention only the much smaller area of the cutting bevel rubs against the book, and the rubbing force is sufficient in proportion to this small area to remove resin deposits tending to accumulate.

Lastly, it is advantageous that the strips 7 cut off from the book slide down the hard carbide surface rather than the relatively soft and easily worn iron of the wheel body.

It should be understood that the present disclosure is for the purpose of illustration only and that this invention includes all modifications and equivalents which fall within the scope of the appended claims.

I claim:

1. A book cutter for books fed parallel to a cutting plane comprising:

a wheel rotating about an axis normal to the book cutting plane, the wheel forming a plurality of cutting bit sockets inclined at a predetermined angle to the book cutting plane, cutting bits for respective sockets, each bit having a body received in one of the sockets and a cutting edge bevel at one end of the body inclined to the body at said predetermined angle, the cutting edge formed by the bevel being disposed parallel to the book cutting plane and facing in the direction of book feed at a substantial angle to a radius of the wheel through the edge so as to slice progressively into the book in the direction of book feed with each rotation of the wheel, and means for securing each bit in its socket with the bevel parallel to the cutting plane.

2. A cutter according to claim 1 wherein each bit extends axially out of the wheel to the cutting plane.

3. A cutter according to claim 1 wherein the securing means allows lengthwise adjustment of the bits in their sockets to define a common cutting plane.

4. A cutter according to claim 2 wherein the securing means allows lengthwise adjustment of the bits in their sockets.

5. A cutter according to claim 1 wherein each bit has a second cutting edge bevel at the bit end opposite the first said bevel, and the bit is secured with the second cutting edge bevel out of contact with and protected in its socket.

6. A book cutter according to claim 1 wherein the cutting edge extends beyond the periphery of the wheel.

7. A book cutter according to claim 1 including means to feed books parallel to the book cutting plane.

8. A book cutter according to claim 6 wherein the wheel rotates the cutting edges in the direction of book feed.

* * * * *